US012656510B2

(12) United States Patent
This et al.

(10) Patent No.: US 12,656,510 B2
(45) Date of Patent: Jun. 16, 2026

(54) METHOD FOR PROCESSING AN X-RAY OR GAMMA RAY SPECTRUM

(71) Applicant: COMMISSARIAT A L'ENERGIE ATOMIQUE ET AUX ENERGIES ALTERNATIVES, Paris (FR)

(72) Inventors: Kélian This, Is sur Tille (FR); Adrien Frigerio, Is sur Tille (FR); Sébastien Colas, Is sur Tille (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 176 days.

(21) Appl. No.: 18/724,477

(22) PCT Filed: Dec. 29, 2022

(86) PCT No.: PCT/EP2022/088054
§ 371 (c)(1),
(2) Date: Jun. 26, 2024

(87) PCT Pub. No.: WO2023/126508
PCT Pub. Date: Jul. 6, 2023

(65) Prior Publication Data
US 2025/0067887 A1 Feb. 27, 2025

(30) Foreign Application Priority Data
Dec. 30, 2021 (FR) ...................................... 2114707

(51) Int. Cl.
*G01T 1/36* (2006.01)
*G01T 1/00* (2006.01)
(Continued)

(52) U.S. Cl.
CPC ................ *G01T 1/366* (2013.01); *G01T 1/36* (2013.01); *G01T 7/005* (2013.01); *G06F 17/10* (2013.01)

(58) Field of Classification Search
CPC . G01T 1/36; G01T 1/366; G01T 7/005; G06F 17/10
See application file for complete search history.

(56) References Cited

U.S. PATENT DOCUMENTS

| | | | |
|---|---|---|---|
| 2007/0211248 A1 | 9/2007 | Caulfield et al. | |
| 2007/0294059 A1* | 12/2007 | Gentile ..................... | G01T 3/00 702/189 |
| 2017/0184739 A1* | 6/2017 | Tabary .................. | G01T 1/2907 |

FOREIGN PATENT DOCUMENTS

| | | | |
|---|---|---|---|
| CN | 111308543 A | 6/2020 | |
| EP | 3 859 403 A1 | 8/2021 | |
| WO | WO-2013006898 A1 * | 1/2013 | ............... G01T 1/36 |

OTHER PUBLICATIONS

International Search Report issued on Mar. 3, 2023 in PCT/EP2022/088054 filed on Dec. 29, 2022 (with English translation of International Search Report), 14 pages.

* cited by examiner

*Primary Examiner* — Mark R Gaworecki
(74) *Attorney, Agent, or Firm* — Oblon, McClelland, Maier & Neustadt, L.L.P.

(57) ABSTRACT

The invention is based on a method for processing an X-ray and gamma-ray radiation spectrum acquired by a spectrometry device (1). The processing method takes into consideration a spectral dispersion matrix (D). The spectral dispersion matrix models the energy response of the device. The method comprises establishing a transfer matrix (U,U',D'), using the spectral dispersion matrix. The transfer matrix is then used to establish a direct model, linking measured (Continued)

variables, forming an input vector (m), and variables to be estimated, forming an output vector. The invention of the direct model allows the output vector (a,s,h,ε) to be estimated. The invention may be applied to quantifying the activity of an object to be inspected or to performing an energy or efficiency calibration of the spectrometry device. FIG. 2B.

19 Claims, 9 Drawing Sheets

(51) Int. Cl.
    *G01T 7/00*         (2006.01)
    *G06F 17/10*      (2006.01)

Energy (keV)

channel

METHOD FOR PROCESSING AN X-RAY OR GAMMA RAY SPECTRUM

TECHNICAL FIELD

The technical field of the invention is spectrometry applied to the detection of ionizing radiation. This essentially involves X-ray or y-ray spectrometry.

PRIOR ART

Devices for detecting ionizing radiation, based on gaseous, semiconductor or scintillating detector materials, allow electrical pulses formed by interactions of the radiation in the detector material to be obtained. The amplitude of each pulse depends on the energy deposited by the radiation in the course of each interaction. These devices are usually coupled to spectrometric measuring circuits. The fields of application are broad, and comprise notably carrying out measurements on nuclear waste, equipment or installations, or radiological environmental monitoring.

Spectrometric measuring systems are nowadays widely used in industry. Software allows for parameterization of pulse processing, and automated measurement control and analysis.

However, some steps are difficult to automate, and still leave a large amount of room for manual adjustments. This involves for example energy calibration, or efficiency calibration, or certain measurement interpretations.

The invention described below facilitates the automation and repeatability of key steps relating to calibration or measurement analysis.

SUMMARY OF THE INVENTION

A first subject of the invention is a method for processing an X-ray or gamma-ray radiation spectrum formed by a spectrometric measuring device, the device comprising:

a detector, configured to detect X-ray or gamma-ray photons, and, upon each detection, to form a pulse the amplitude of which depends on an energy released by the X-ray or gamma-ray photon that interacted in the detector;

a spectrometric measuring circuit, configured to form a spectrum, the spectrum corresponding to a number of photons detected in various channels, an amplitude or an energy corresponding to each channel;

the method comprising the following steps:

a) arranging the device facing an object likely to contain one or more radionuclides emitting X-ray or gamma-ray photons that are incident on the detector, each radionuclide emitting photons at at least one emission energy;

b) the detector detecting a portion of the incident photons, and forming a spectrum of the detected photons, the spectrum containing peaks extending around each emission energy of each radionuclide, each peak resulting from pulses detected in a channel and corresponding to said emission energy;

c) processing the spectrum so as to obtain a quantity of pulses detected in each peak of the spectrum;

the method being characterized in that step c) comprises the following sub-steps:

c1) taking into consideration a list of radionuclides that are present or likely to be present in the object;

c2) taking into consideration an input vector each term of which comprises a quantity of pulses in each peak;

c3) taking into consideration a spectral dispersion matrix each term of which is associated with a channel and an emission energy, and corresponds to a probability of an incident photon the energy of which is said emission energy being detected in said channel;

c4) forming a transfer matrix based on the spectral dispersion matrix;

c5) taking into consideration a direct model, according to which the input vector is obtained by a matrix product of the transfer matrix and an output vector, each term of the output vector corresponding to:

an activity of at least one radionuclide;

or a number of photons detected at an energy corresponding to an emission energy of a radionuclide;

or a detection efficiency at an emission energy of a radionuclide;

c6) inverting the direct model, so as to estimate the output vector.

Sub-step c6) may comprise estimating the input vector, together with the output vector. According to one embodiment:

step c) comprises taking into consideration a matrix of reference spectra each term of which is associated with an emission energy and a radionuclide, each term corresponding to a number of photons detected in a peak centered on a channel corresponding to said emission energy, when the activity of the radionuclide is equal to a predetermined reference activity;

in step c), the transfer matrix is a product of the spectral dispersion matrix and the matrix of reference spectra, or of its transpose, such that each term of the transfer matrix is associated with a radionuclide and a channel, each term of the transfer matrix corresponding to a number of photons, emitted by the radionuclide, at the reference activity, that are detected in said channel (i).

the output vector contains terms respectively representative of the activity of each radionuclide present in the object.

The reference activity may be 1 Bq.

According to one embodiment:

in step c), the transfer matrix is the spectral dispersion matrix;

the output vector contains terms respectively representative of a number of photons detected in channels corresponding to various emission energies of the radionuclides present in the object.

Sub-step c6 may comprise estimating a width of each peak of the input vector, each estimated width parameterizing the spectral dispersion matrix.

Sub-step c6 comprises estimating a position, among the channels, corresponding to the center of each peak of the input vector, each estimated position parameterizing the spectral dispersion matrix.

According to one possibility, the object contains calibration radionuclides the emission energies of which are known, the method comprising:

based on the output vector, selecting channels in which the spectrum contains a number of photons greater than a threshold;

confronting the selected channels with the emission energies of the calibration radionuclides;

determining an energy function linking each channel to an energy on the basis of the confrontation.

According to one embodiment:

the object contains calibration radionuclides the nature and possibly the activity of which are known;

step c) comprises taking into consideration an incidence vector each term of which corresponds to a number of photons incident on the detector at each emission energy;

in step c), the transfer matrix is a product of each term of the spectral dispersion matrix, associated with an emission energy, and the value of the incidence vector, at said emission energy, such that each term of the transfer matrix is associated with an emission energy and a channel, each term of the transfer matrix corresponding to a number of photons, emitted by each calibration radionuclide, that are detected in the channel;

the output vector contains terms respectively representative of the detection efficiency of the device at various emission energies.

Step c) may comprise taking into consideration an energy function, the energy function being such that:

the energy function establishes a correspondence between the rank of a channel and an energy value;

the energy function is a parametric function parameterized by at least one parameter;

the method being such that sub-step c6) comprises estimating at least one parameter of the energy function.

Step c) may comprise taking into consideration a resolution function, the resolution function being such that:

the resolution function determines a width of each peak as a function of a channel or energy;

the resolution function is a parametric function parameterized by at least one parameter;

the method being such that sub-step c6) comprises estimating at least one parameter of the resolution function.

The method may take into consideration a shape function, the shape function establishing an analytical relationship that models the shape of each peak of the detected spectrum.

A second subject of the invention is a device intended to acquire a spectrum of X-ray or gamma-ray photons emitted by an object, the object being likely to contain radionuclides, the device comprising:

a detector, configured to detect X-ray or gamma-ray photons, and, upon each detection, to form a pulse the amplitude of which depends on an energy released by the X-ray or gamma-ray photon that interacted in the detector;

a spectrometric measuring circuit, configured to form a spectrum, the spectrum corresponding to a distribution of the amplitudes of the pulses detected by the detector;

a processing unit, programmed to implement step c) of a method according to the first subject of the invention.

A third subject of the invention is a medium, able to be connected to a computer, comprising instructions for implementing step c) of a method according to the first subject of the invention based on a spectrum resulting from a spectrometric detector. The medium may be integrated into a computer or connected to a computer by a wired or wireless link.

The invention will be better understood on reading the description of the exemplary embodiments that are presented, in the rest of the description, with reference to the figures listed below.

FIGURES

Figures 7, 8:
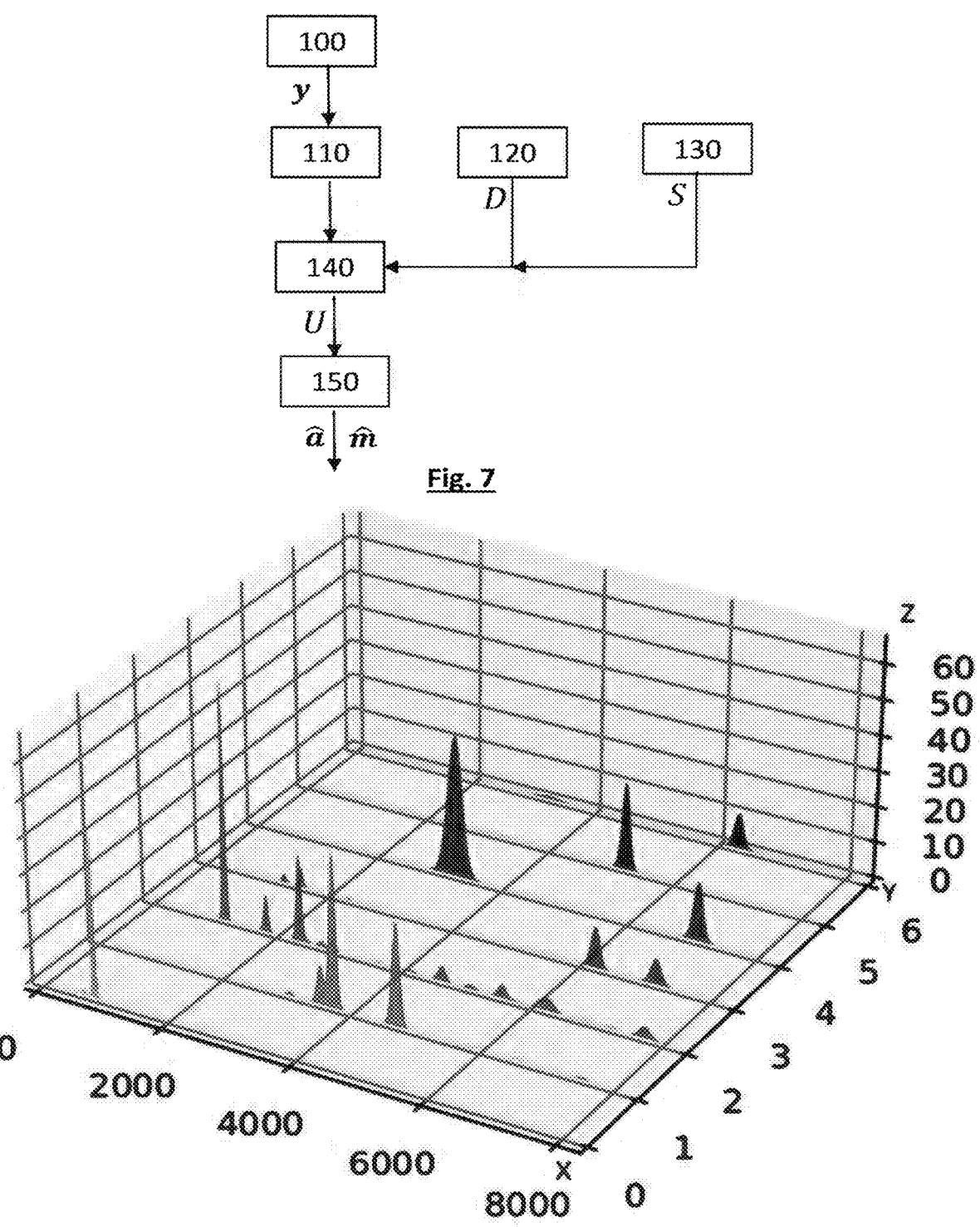

FIG. 7 schematically shows the steps of a first embodiment.

FIG. 8 shows a transfer matrix used in the first embodiment.

Figures 9, 10:
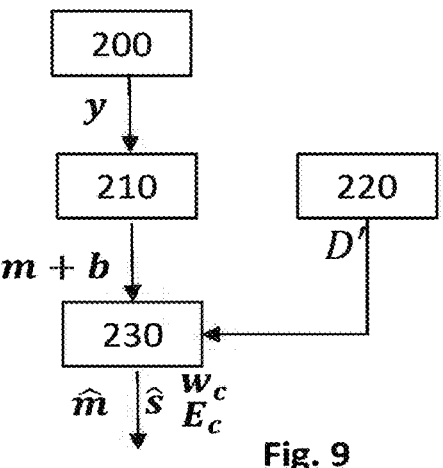

FIG. 9 schematically shows the steps of a second embodiment.

FIG. 10 shows one example of peak area extraction carried out by implementing the second embodiment.

Figure 11:
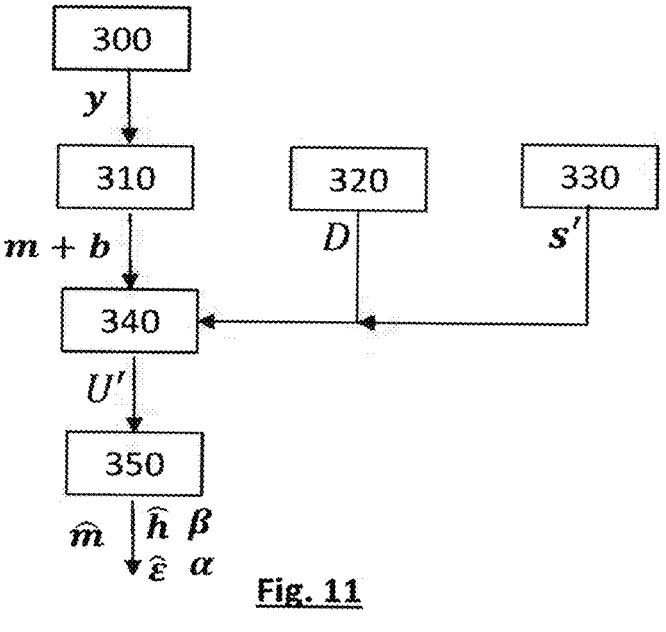

FIG. 11 schematically shows the steps of a third embodiment.

Figure 12:
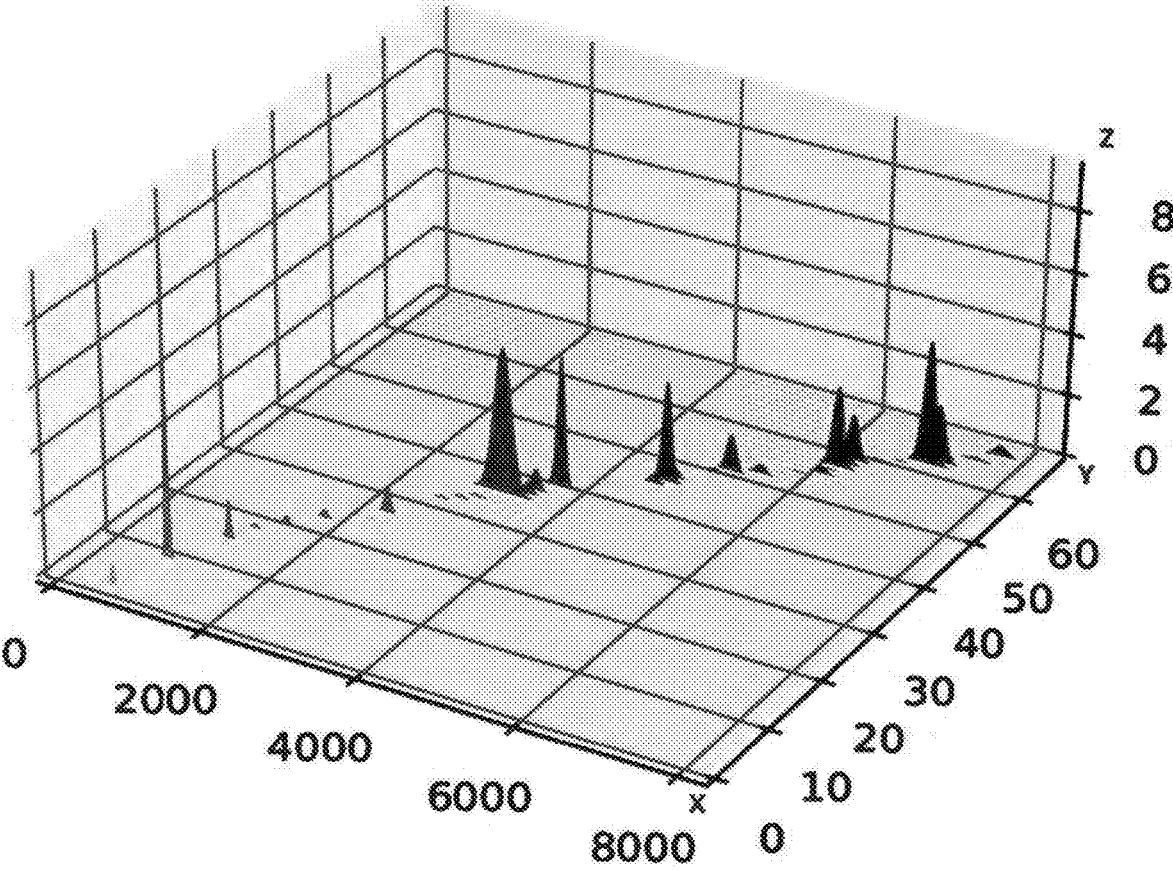

FIG. 12 illustrates a transfer matrix used in the third embodiment.

Figure 13:
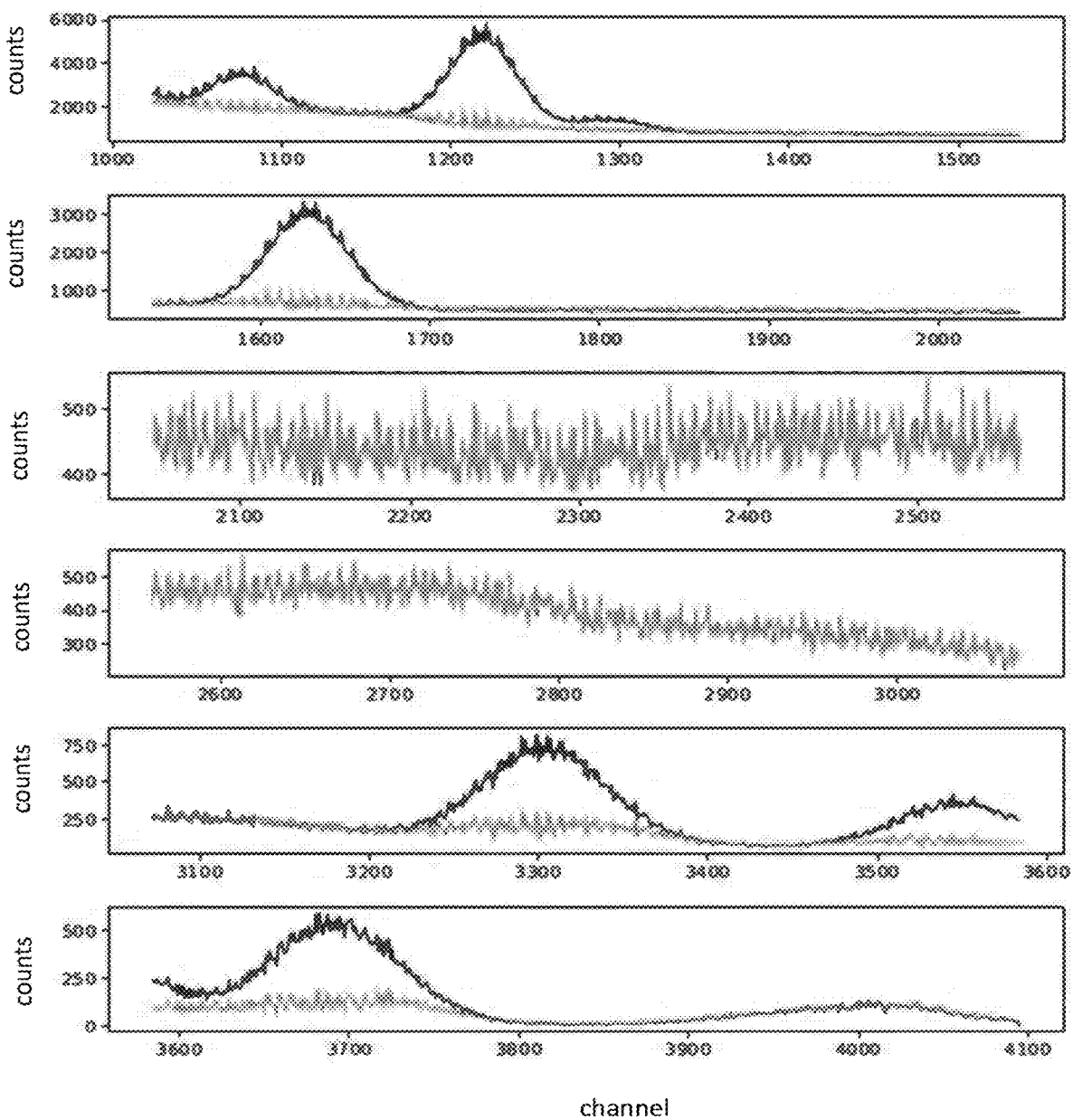

FIG. 13 shows one example of peak extraction carried out by implementing the third embodiment.

DESCRIPTION OF PARTICULAR EMBODIMENTS

Figure 1:
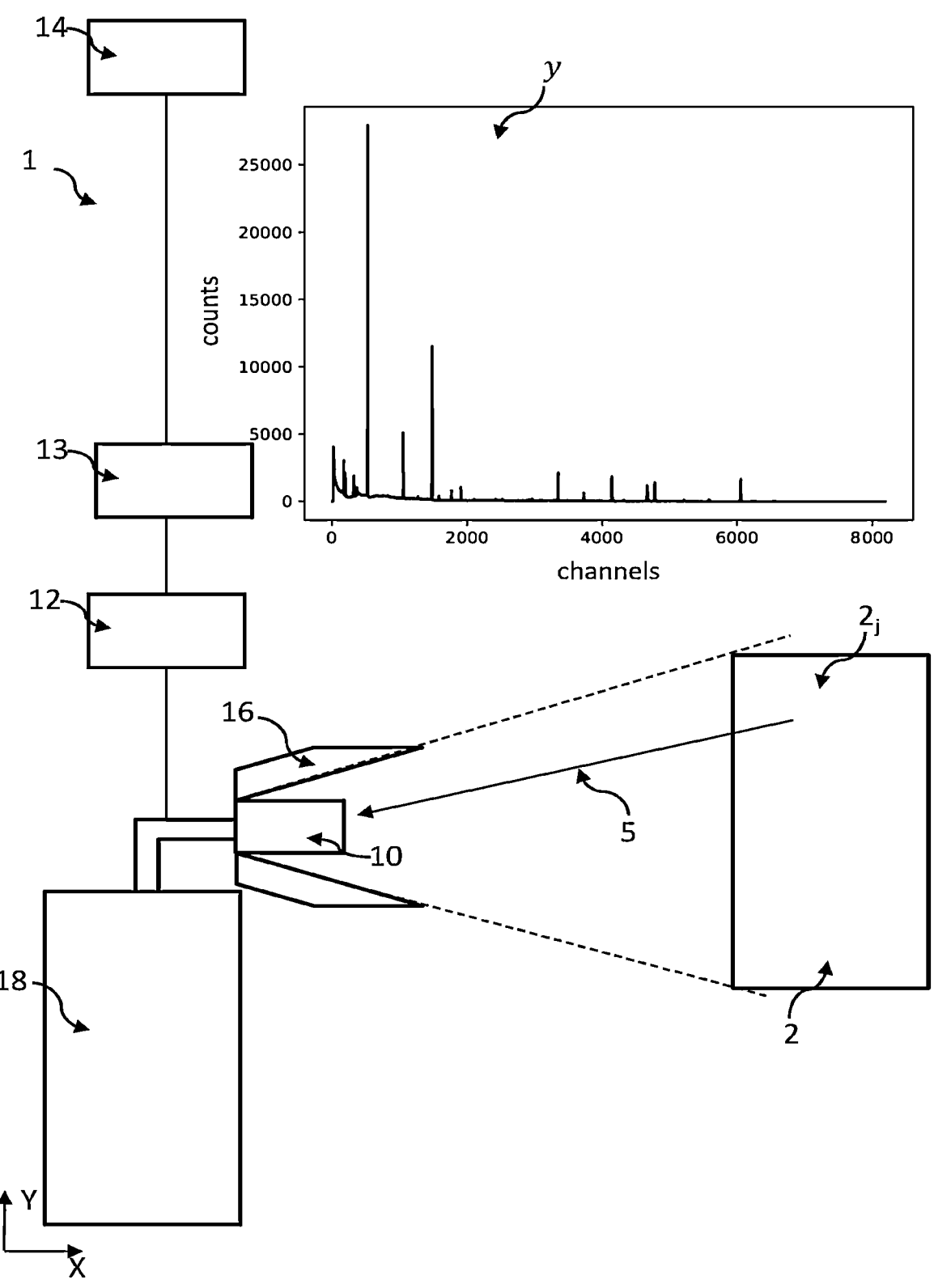
FIG. 1 shows one example of a device for implementing the invention.

FIG. 1 shows a device 1 for implementing the invention. The device is a measuring system, comprising a detector 10, able to interact with ionizing radiation 5 emitted by an object 2. The object 2 here is nuclear waste, which may comprise various irradiating radionuclides $2_j$. Generally speaking, the irradiating radionuclides likely to be present in a measured object are known beforehand. A list of irradiating radionuclides potentially present in the analyzed object may notably be compiled. The index j denotes each irradiating radionuclide.

Ionizing radiation is understood to mean X-ray or gamma-ray photonic radiation formed of photons the energy of which is for example between 1 keV and 2 MeV.

In the example shown, the detector comprises a germanium (Ge) semiconductor material, but a semiconductor material commonly used to detect ionizing photons, for example Si, CdTe, CdZnTe, could also be involved. The photons forming the incident radiation form interactions in the detector material. The detector material is subjected to a bias voltage V. Each interaction generates charge carriers, which are collected by an electrode, generally an anode.

Other types of detectors, for example scintillators coupled to a photon/charge carrier converter, or a gas detector such as an ionization chamber, may be used, provided that they allow the collection of a quantity of charges Q under the effect of an energy E released by the ionizing radiation in the course of an interaction in the detector 10. Among the usual scintillator detectors, mention may be made of NaI(Tl) or $LaBr_3$.

The detector 10 is connected to an electronic circuit 12 that is configured to generate a pulse the amplitude of which depends on, and is preferably proportional to, the quantity of charge collected during an interaction. The quantity of charge corresponds to the energy deposited by the radiation in the course of the interaction.

The electronic circuit 12 is connected to a spectrometry unit 13 that is arranged downstream of the electronic circuit and that makes it possible to collect all of the pulses formed during an acquisition period. Each pulse corresponds to an interaction of the incident radiation in the detection material. The spectrometry circuit then classifies the pulses as a function of their amplitude A so as to provide a histogram containing the number of pulses detected as a function of their amplitude. This histogram is an amplitude spectrum. It is usually obtained using a multichannel analyzer. Each amplitude is discretized by channel, each channel being assigned an amplitude band. The value of each channel of the spectrum corresponds to a number of pulses the amplitude of which is within the amplitude band assigned to the channel. Each amplitude band corresponds to an energy band, the correspondence being bijective. Each channel is thus assigned an energy band or an amplitude band.

The relationship between amplitude and energy may be established by irradiating the detector using a calibration source, emitting radiation the energy of which is known. This in particular involves radiation having at least one discontinuity, or energy peak, at a known energy value. This operation is usually denoted by the term energy calibration. For example, in gamma-ray spectrometry, the detector is exposed to a $^{152}$Eu calibration source, producing photons at known emission energies. It is also possible to use a $^{137}$Cs source, producing mostly photons the energy of which is 661.6 keV. It is also possible to use a $^{60}$Co source producing photons the energy of which is mostly 1173 keV and 1332 keV. The energy calibration makes it possible to establish an energy function $f_e$ that makes it possible to establish an analytical relationship between amplitude and energy. Taking into consideration the energy function $f_e$ makes it possible, by changing variable, to obtain an energy spectrum y from an amplitude spectrum $y_A$.

The spectrum y corresponds to a histogram of the amplitudes of each detected pulse, discretized by energy or amplitude channels. Each channel is assigned an energy band, for example [401, 402] keV. The spectrum y may be expressed in the form of a vector $(y_1, \ldots y_i \ldots, y_n)$, where n corresponds to the total number of channels. Each channel is assigned a rank i, with $1 \leq i \leq n$.

Each channel of rank i is delimited by a lower amplitude $A_i$ and an upper amplitude $A_{i+1}$, such that a detected pulse is assigned to the channel of rank i when its amplitude is between $A_i$ and $A_{i+1}$.

The lower amplitude $A_i$ of each channel corresponds to a lower energy $e_i$. The upper amplitude $A_{i+1}$ of each channel corresponds to an upper energy $e_{i+1}$. The amplitude-energy correspondence is established by the energy function $f_e$. Thus, $$e_i = f_e\left(\frac{i-1}{n}, \beta\right) \tag{1}$$

and $$e_{i+1} = f_e\left(\frac{i}{n}, \beta\right) \tag{2}$$

$\beta$ is a set of parameters of the energy function $f_e$, described below.

The variable $$\frac{i-1}{n}$$

corresponds to a relative position of the channel in relation to the maximum number of channels of the spectrum. This is a normalized rank of each channel, between 0 (i=1) and 1 (i=n+1). Normalization makes it possible to establish an energy function $f_e$ independent of the number of channels n, the latter being able to be parameterized.

The energy function may be polynomial. For example, it may be a linear function, in which case $\beta=(\beta_0, \beta_1)$ and $$e_i = \beta_0 + \beta_1 \frac{i-1}{n}. \tag{3}$$

It may be a 2nd-degree polynomial function, in which case $$e_i = \beta_0 + \beta_1 \frac{i-1}{n} + \beta_2 \left(\frac{i-1}{n}\right)^2 \tag{4}$$

The vector $\beta$ is either assumed to be known, following an energy calibration operation on the detector, or estimated based on a spectrum of the radiation emitted by a calibration object the composition of which is known. Optionally, the device comprises a collimator 16 that is intended to restrict the field of observation of the detector. The collimator generally comprises a gamma ray photon-attenuating material, for example lead or a tungsten-containing alloy.

In the example shown, the detector 10 is connected to a cryostat 18 comprising liquid nitrogen in order to keep the Ge detector at an operating temperature.

The device comprises a processing unit 14 that is programmed to implement steps of algorithms described with reference to FIGS. 3A to 3C. The processing unit 14 is connected to the spectrometry unit 13, from which it receives each measured spectrum.

Figure 2A:
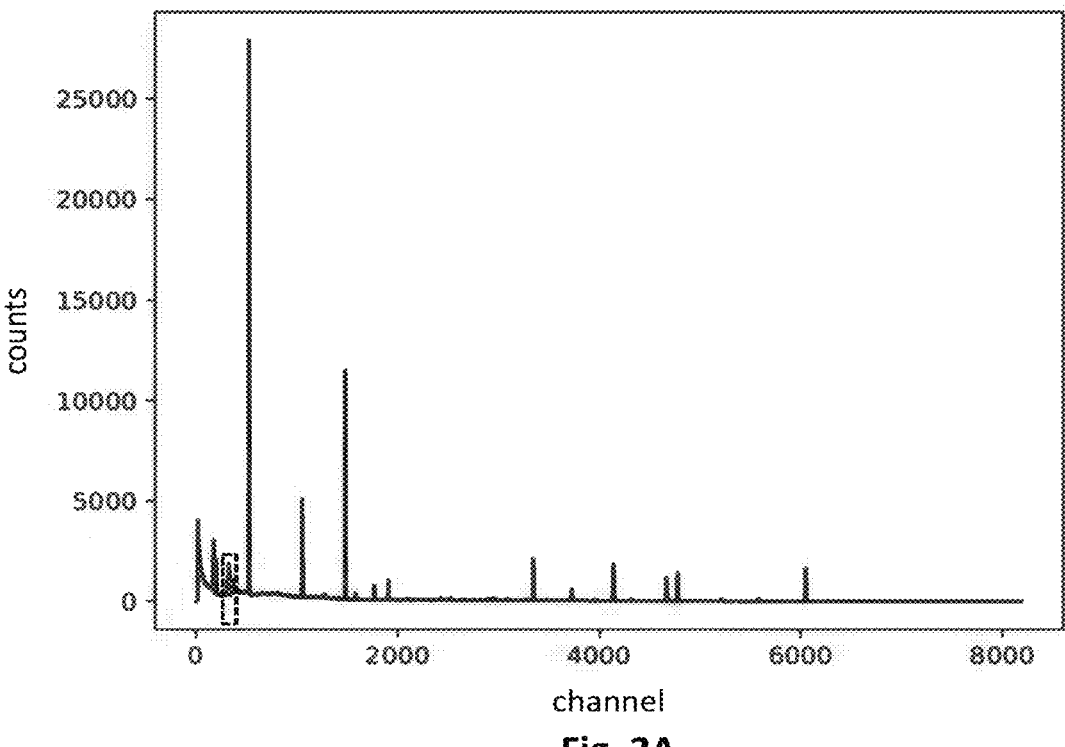
FIG. 2A shows one example of a spectrum.
Figure 2B:
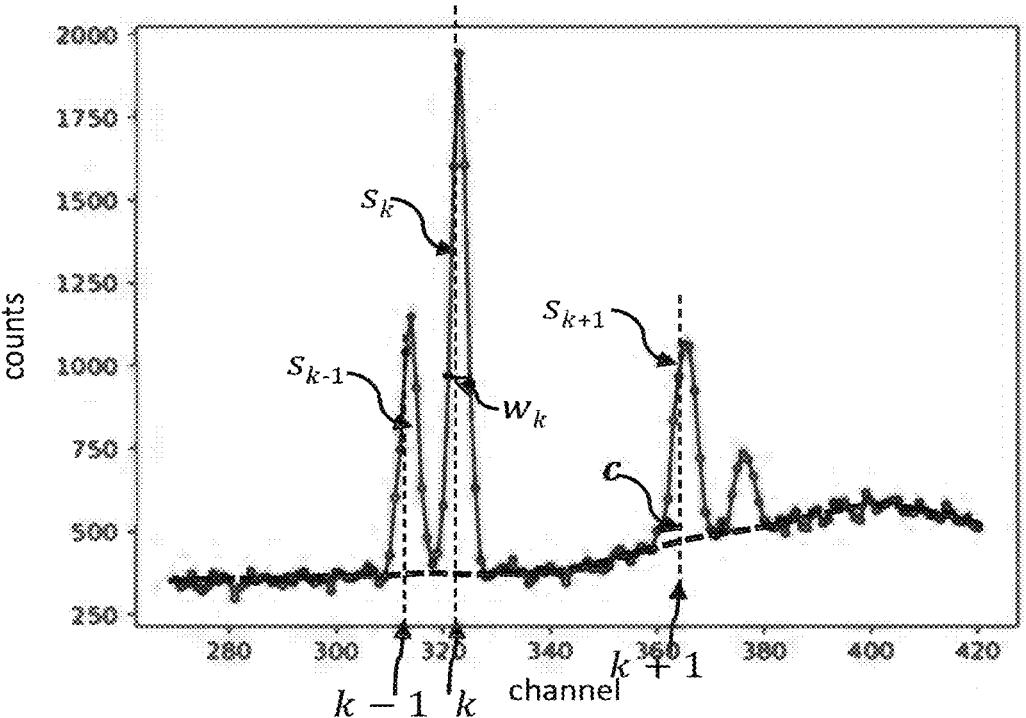
FIG. 2B is a detail of FIG. 2A.

A description will now be given of the various variables that are used in processing operations implemented by the processing unit 14 and that are described below.
Useful Component of the Spectrum The objective of a gamma-ray spectrometry measurement is to identify the radionuclides $2_j$ present in the object 2 and, preferably, to estimate their respective activities. FIG. 2A shows a spectrum y resulting from a germanium detector exposed to a source containing the radionuclide $^{152}$Eu. The x-axis corresponds to the channels, and the y-axis corresponds to the number of pulses the amplitude of which corresponds to each channel. FIG. 2B is a detail of FIG. 2A, corresponding to the rectangular region drawn in FIG. 2A.

The spectrum y that is shown contains multiple peaks, each peak corresponding to an emission energy $E_k$ of a radionuclide present in the object 2. These peaks form the useful information of each spectrum, based on which it is possible to identify radionuclides and quantify their respective activities. The spectrum also contains a continuum c, corresponding to photon scattering in the detector or before said photons reach the detector. The continuum corresponds to that portion of the spectrum below and between each peak. In FIG. 2B, the continuum c is represented by a dashed curve. The spectrum also contains a background noise component b, reflected by statistical fluctuations in the spectrum y.

The spectrum y may thus be decomposed as follows:

$$y = m + c + b \tag{5}$$

where y, m, c and b are vectors of dimension (1,n).

The information relating to the peaks is contained in the vector m, which forms the useful component of the spectrum y. The vector m contains all of the peaks of the spectrum y: it is a vector representative of the mixture of the peaks of the spectrum y. The vectors m and y have the same dimension.

A description will now be given of various embodiments, including processing of the measured spectrum y. One step in common to the various embodiments is that of extracting the useful component m from the spectrum y.

The continuum c may be estimated by implementing a baseline suppression algorithm, as described in the publication This K. et al "Contribution to continuum estimation in gamma spectrum by observation by local minima". This thus gives:

$$y - \hat{c} = m + b \tag{6}$$

where $\hat{c}$ is the estimate of the continuum.

Figures 3A, 3B:
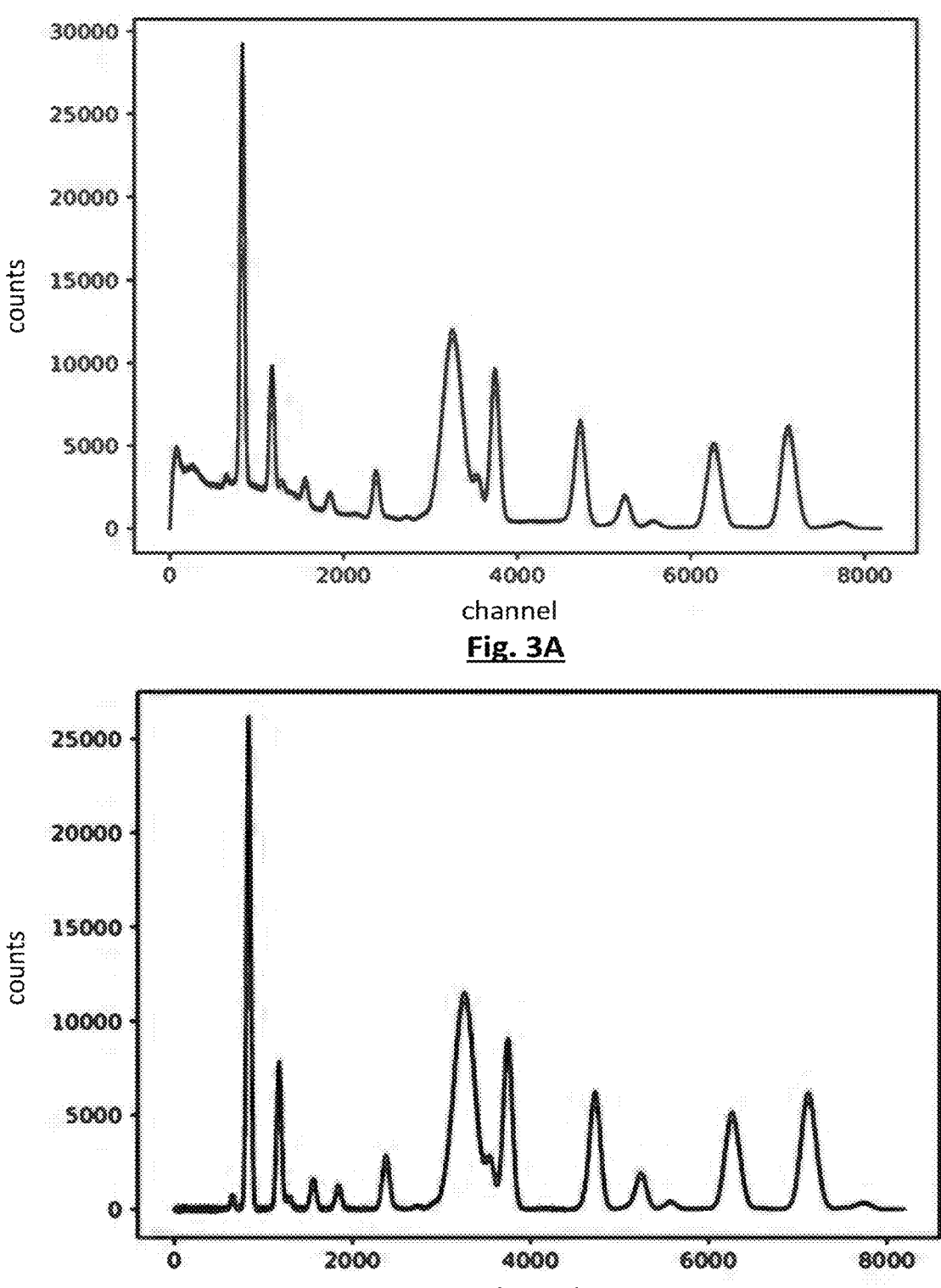
FIG. 3A is another example of a spectrum.
FIG. 3B shows the spectrum of FIG. 3A after extraction of the baseline.

FIG. 3A shows a spectrum established with a LaBr$_3$ spectrometric detector of dimension 1.5 inches by 1.5 inches. FIG. 3B shows the spectrum after extraction of the continuum. FIG. 3B comprises the useful component m, along with the background noise b.

As an alternative, the vector m may be established using dedicated software for individual extraction of spectrometry peaks, by baseline suppression or estimation. The vector m may result from a concatenation of each peak individually extracted from a measured spectrum.

It will be considered below that the object potentially consists of q radionuclides $2_j$, the respective activities of which are $a_1 \ldots a_j \ldots a_q$, forming an activity vector a of dimension (q,1). A list of the q radionuclides potentially present in the object is drawn up beforehand. It includes all gamma ray-emitting radionuclides likely to be present in the object. The radionuclides in the list emit photons at energies $E_1 \ldots E_k \ldots E_p$. The energies $E_1 \ldots E_k \ldots E_p$ correspond to the set, without duplicates, of the emission energies of the q radionuclides, classified in ascending order. A portion of this set, for example limited to energies for which the emission intensities are considered to be sufficient, may also be involved. Each radionuclide j with an activity equal to 1 Bq generates an energy $E_k$ with an intensity $I_{jk}$. The intensity $I_{jk}$ is non-zero when the index k corresponds to an emission energy $E_k$ of the radionuclide.

The vector m is formed by a contribution $u_j$ of each radionuclide present in the object. $u_j$ is a vector of dimension (1, n), each term $u_{ji}$ of which corresponds to a quantity of photons emitted by the radionuclide j and detected in the channel i, with $1 \leq j \leq n$. Thus, $$m = \sum_{J=1}^{q} a_j u_j \tag{7}$$

Spectral Dispersion Matrix

Under the effect of imperfections in the detector 10 or in the circuit 12 or in the spectrometry unit 13, an interaction that releases an emission energy $E_k$ may be detected not only in the channel of rank k corresponding to the energy $E_k$, but in other adjacent channels, by a dispersion effect of the energy estimated by the device. This is reflected in that a peak does not correspond to a Dirac distribution centered on the channel of rank k corresponding to the energy $E_k$, but to a peak, of a certain area $s_k$, on either side of the channel of rank k. FIG. 2B shows 3 channels of ranks k−1, k and k+1, which correspond to three successive peaks.

Spectral dispersion is expressed as a full width at half maximum $w_k$ of the peaks at each emission energy $E_k$, with:

8

$$w_k = \begin{cases} k_D f_r(E_k, \alpha) & \text{if } E_k = 511 \text{ keV} \\ f_r(E_k, \alpha) & \text{if } E_k \neq 511 \text{ keV} \end{cases} \tag{8}$$

$f_r$ is a resolution function, able to be determined experimentally: the resolution function models the evolution of the full width at half maximum $w_k$ as a function of energy. One example of experimentally determining the resolution function is presented below, in the second embodiment.

The vector $\alpha$ is a vector of the parameters of the resolution function $f_r$. This parameter is assumed to be known. One example of experimentally determining the vector $\alpha$ is presented below, in the second embodiment.

$k_D$ is an expansion factor reflecting the Doppler effect, which widens the peak at 511 keV. This is a scalar, greater than or equal to 1, specific to the source, in particular its temperature. It may vary from one measurement to another. It is useful to estimate this scalar only for spectra having an emission line centered on the 511 keV energy.

The resolution function may take various parametric forms, for example:

$$f_r(E_k) = \sqrt{\alpha_0^2 + \alpha_1^2 E_k + \alpha_2^2 E_k^2} \tag{9}$$

where $$\alpha = (\alpha_0, \alpha_1, \alpha_2)$$

In addition to the full width at half maximum, the spectral dispersion may also be modeled by the shape of the peaks. The shape of the peaks may be taken into consideration by a shape function $f^s$, which characterizes the shape of the peaks. The shape function is determined a priori, for example on the basis of feedback or previous tests. In the examples described below, the shape function $f_s$ is considered to be Gaussian. For example, $$f_s(e) = \frac{2 \ln 2}{\sqrt{\pi}} \exp\left(-(2 \ln(2) e^2)\right) \tag{10}$$

Taking into consideration the full width at half maximum $w_k$ and the shape function $f_s$, it is possible to determine a probability $d_{ik}$ of a photon releasing an energy $E_k$ in the detector being detected in a channel of rank i, with:

$$d_{ik} = \frac{1}{N_k(e_{i+1} - e_i)} \int_{e_i}^{e_{i+1}} \frac{1}{w_k} f_s\left(\frac{e - E_k}{w_k}\right) de \tag{11}$$

where:

$e_i$ and $e_{i+1}$ are respectively the energies forming the boundaries of the channel of rank i;

e is energy;

$N_k$ is a normalization constant.

If $d_{ik}$ is assimilated to a probability, it is necessary that $$\sum_{i=1}^{n} d_{ik} = 1$$

hence:

$$N_k = \sum_{i=1}^{n} \frac{1}{N_k(e_{i+1} - e_i)} \left[ F_s \left( \frac{e - E_k}{w_k} \right) \right]_{e_i}^{e_{i+1}} \qquad (12)$$

$F_s$ is a primitive of $f_s$.

The probability $d_{ik}$ is defined for all of the p emission energies $E_k$ ($1 \le k \le p$) along with all of the n spectral channels ($1 \le i \le n$). Based on the various probabilities $d_{ik}$, it is possible to form a spectral dispersion matrix D, of dimension (n,p), each term D(i,k) of which is such that $D(i,k) = d_{ik}$.

The spectral dispersion matrix D assumes the prior definition of the resolution function $f_r$, parameterized by $\alpha$, of the shape function $f_s$ and also of the energy function $f_e$, parameterized by $\beta$. The spectral dispersion matrix corresponds to a spectral response of the detector. A spectral response is understood to mean the function modeling the shape of a peak as a function of energy.

Figure 4:
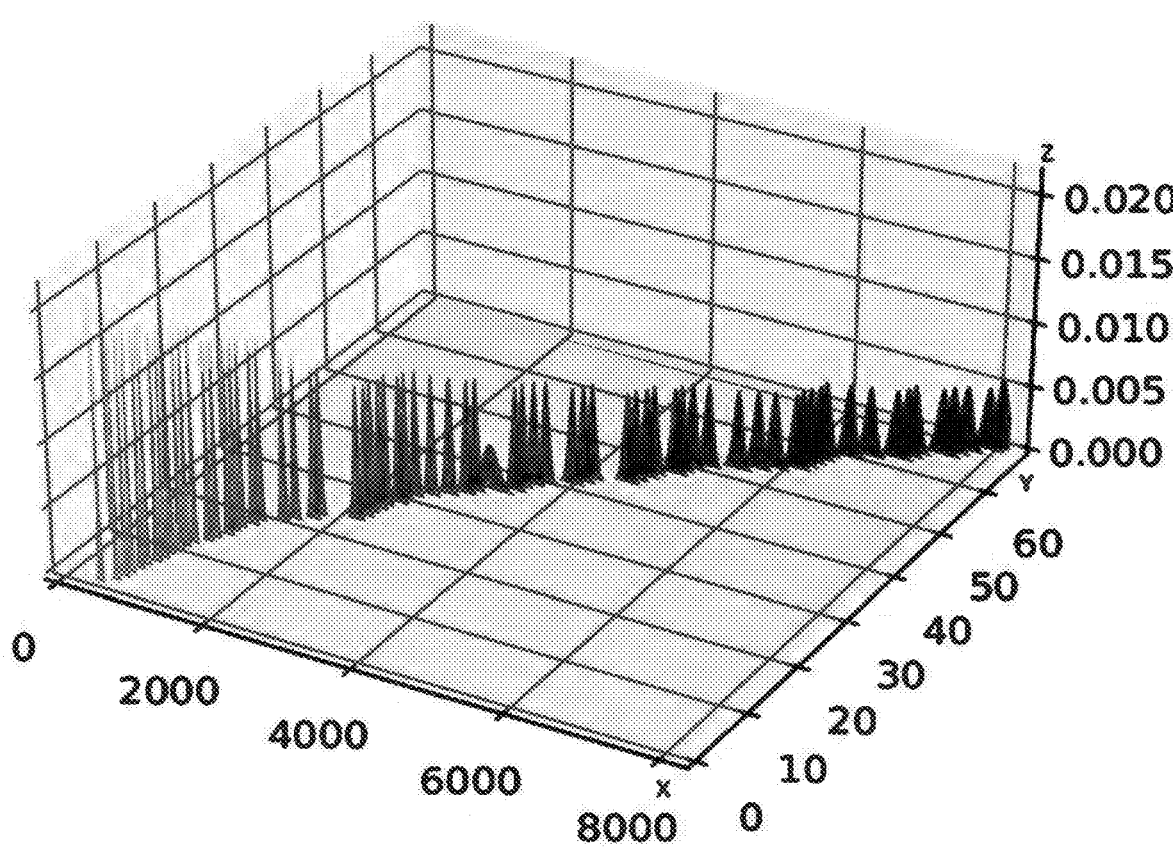
FIG. 4 illustrates one example of a spectral dispersion matrix.

FIG. 4 illustrates one example of a spectral dispersion matrix. The axis X corresponds to each channel i, the axis Y corresponds to each emission energy peak k, and the axis Z corresponds to the value $d_{ik}$.

As an alternative, the spectral dispersion matrix may be established on the basis of modeling of the detector, with a possible readjustment carried out on the basis of experimental measurements. It may also be determined experimentally, in particular when the detector is intended to be used repeatedly on the same radionuclides.

Matrix of Reference Spectra

In the course of certain steps that are described below, a previously established matrix of reference spectra S of dimension (q,p) is taken into consideration, each term S(j,k) of which is the area of a spectral peak, of energy $E_k$ when a radionuclide j is present, in the source, with a predetermined activity. The predetermined activity is for example a unit activity: 1 Bq for each radionuclide. Each term S(j,k) thus corresponds to a quantity of photons detected in a peak centered on an emission energy $E_k$ for a unit activity of the radionuclide $\mathbf{2}_j$. The reference matrix S is of dimension (q,p).

$$S(j, k) = s_{jk} = T I_{jk} \varepsilon_k \qquad (13)$$

T is the acquisition period for the spectrum y;
$I_{jk}$ is an emission intensity of one photon of energy $E_k$ with an activity of 1 Bq from the radionuclide j, this corresponding to the number of photons emitted, at this energy, per second.

$\varepsilon_k$ is an observation efficiency of the device at the energy $E_k$. $\varepsilon_k$ corresponds to the number of photons detected in a peak centered on the energy $E_k$, divided by the number of photons emitted by the object at this energy. The observation efficiency $\varepsilon_k$ is obtained by calibration, for example by arranging standard sources the radionuclides and activity of which are known, in a calibration object representative of the object to be measured. Determining the observation efficiency may also involve modeling using computing codes, in particular based on Monte Carlo methods (MCNP for example).

It is possible to form an observation efficiency vector $\varepsilon$, of dimension (p,1), each term $\varepsilon_k$ ($1 \le k \le p$) of which is the observation efficiency at the energy $E_k$. The observation efficiency E may be considered to be a product of two vectors:

$$\varepsilon = \varepsilon_a \odot h \qquad (14)$$

Figure 5:
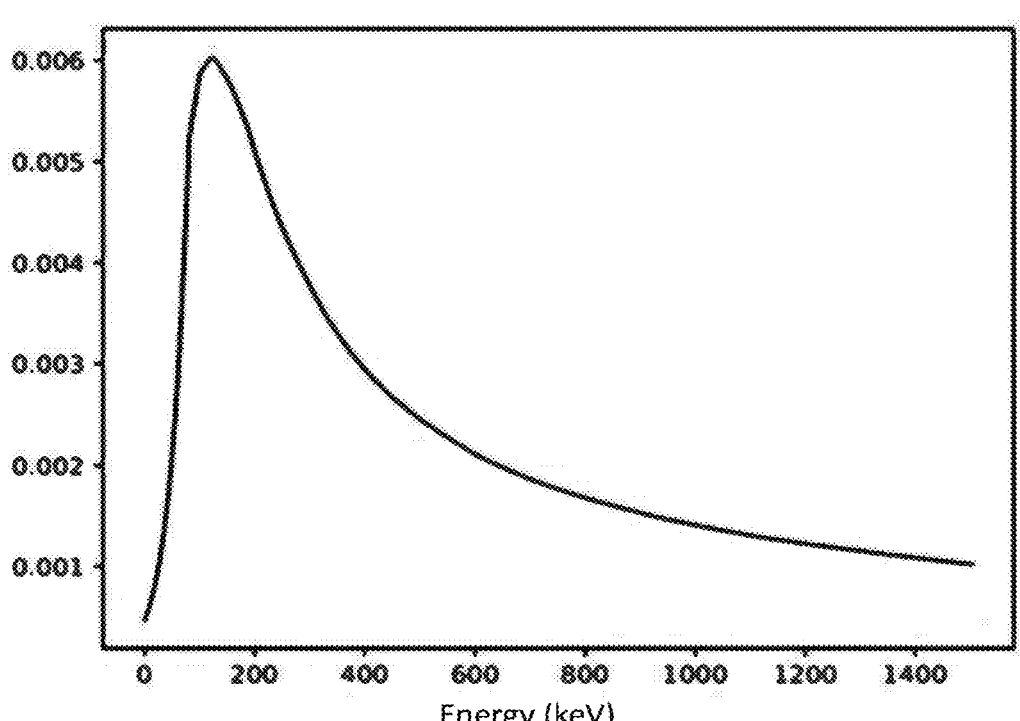
FIG. 5 illustrates a vector each term of which corresponds to a detection efficiency at one energy.

$\odot$ is a Hadamard product (term-to-term product)
$\varepsilon_a$ is a vector of dimension (p,1) each term $\varepsilon_{a,k}$ of which is an absorption efficiency at the energy $E_k$. Absorption efficiency refers to the absorption of radiation, at each emitted energy, by the object itself or any other absorbent screen placed between the object and the detector, for example the collimator of the detector. $\varepsilon_a$ may be obtained by modeling using a computing code modeling the transport of particles in matter (MCNP for example).
h is a vector of dimension (p,1), corresponding to the transfer function of the detector. Each term $h_k$ corresponds to a detection efficiency, that is to say a ratio between a number of photons emitted by the source, of energy $E_k$, and a number of photons detected by the measuring device in the peak centered on the channel of rank k. h may be determined experimentally, as described in the third embodiment. One example of a vector h is shown in FIG. 5. In FIG. 5, the x-axis corresponds to energy and the y-axis corresponds to detection efficiency $h_k$.

The matrix of reference spectra S corresponds to an efficiency response of the detector. An efficiency response is understood to mean the function modeling a ratio between the pulses detected in a peak associated with an energy and the number of photons emitted by the source at said energy.

Figure 6:
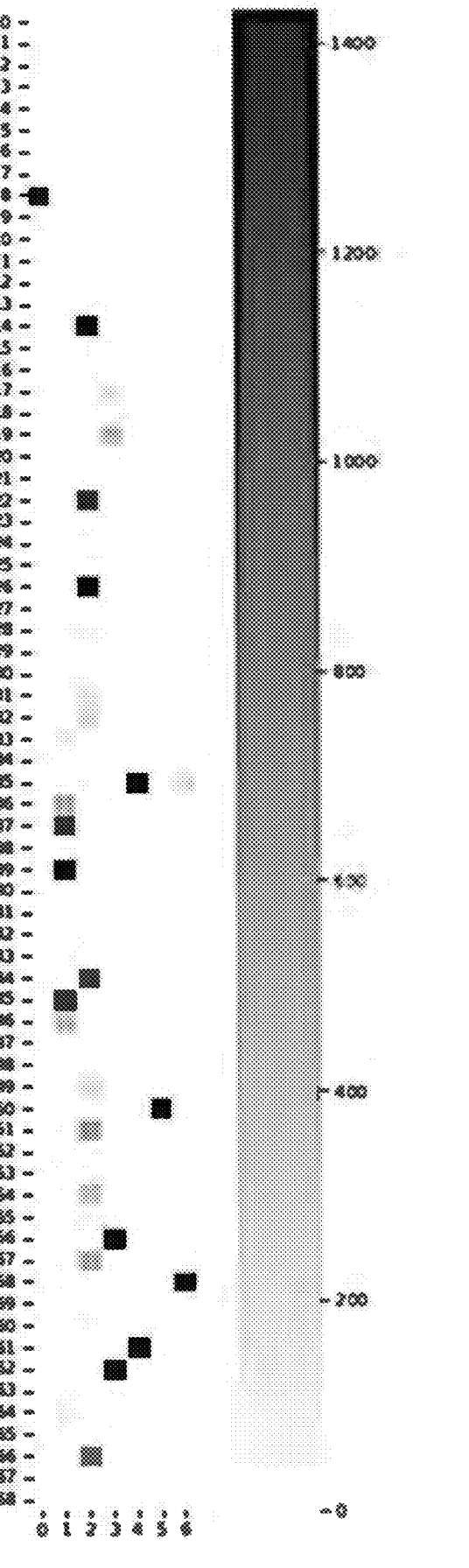
FIG. 6 shows one example of a matrix of reference spectra.

FIG. 6 illustrates one example of a matrix of reference spectra. The axis X corresponds to each radionuclide j, the axis Y corresponds to each emission energy peak k, and the axis Z corresponds to the value $s_{jk}$.

First Embodiment: Quantification of Activity

The objective of this first embodiment is to process the measured spectrum y in order to estimate the activity $a_j$ of each radionuclide $\mathbf{2}_j$ likely to be present in the object under test.

The main steps of this embodiment are shown schematically in FIG. 7.

Step 100: measuring the spectrum y using the measuring device.

Step 110: extracting the vector m+b

The vector m+b is for example estimated by carrying out the subtraction:

$$y - \hat{c} = m + b \qquad (6)$$

$\hat{c}$ may be estimated using a baseline estimation algorithm as described above.

Step 120: taking into consideration the spectral dispersion matrix D, which is established beforehand. In this embodiment, the spectral dispersion matrix is assumed to be known, with the exception of the factor $k_D$. When the spectrum y contains a peak at 511 keV, the factor $k_D$ is estimated in step 150.

Step 130: taking into consideration the matrix S of reference spectra established beforehand.

Step 140: obtaining a transfer matrix U, such that $$U = D^T S \qquad (15)$$

U is a matrix of dimension (n,q), each term $u_{ij}$ of which is a contribution of a radionuclide j, of activity 1 Bq, in the photons detected in the channel i.

The transfer matrix U corresponds to a response function of the detector, for the radionuclides j under consideration. It may also take into consideration the presence of screens between the detector and the radionuclides. The spectral response function corresponds to the matrix D, and the efficiency response function corresponds to the matrix S.

Taking into consideration a transfer matrix U adapted to certain predetermined radionuclides makes it possible to form a matrix one of the dimensions of which is reduced. FIG. 8 shows one example of a transfer matrix U of dimension (8192×7). Each row of the matrix represents an image of the emission peaks of a radionuclide, in each channel, for a unit activity of the radionuclide.

Step 150: estimating m and the activity of each radionuclide.

During this step, it is sought to estimate a vector a each term of which is an activity $a_j$ of the radionuclide j in the measured object. m and a: are linked by the direct model:

$$m = Ua \quad (16)$$

An optimization algorithm for minimizing a cost function J is implemented so as to estimate the vectors a, b and, optionally, the scalar $k_D$.

a is a vector of dimension (q,1).

The cost function J may be such that:

$$J(\theta) = \|y - \hat{c} - m(\theta)\|^2 \quad (17)$$

$$\text{with } m = Ua$$

where $\theta$ corresponds to unknown variables governing the cost function: these are a and optionally $k_D$ when m contains a peak centered on 511 keV. When m does not contain a peak on 511 keV, $k_D$ takes an arbitrary value. $\| \ \|$ denotes the L2 norm operator. Minimizing the cost function makes it possible to estimate the unknowns $\theta$ using the expression:

$$\theta = \underset{\theta}{\mathrm{argmin}} \, (J(\theta)) \quad (18)$$

The estimates of m and a are combined due to the relationship m=Ua.

According to another possibility, it will be assumed that $J(\theta)$ follows a normal law with respect to $\theta$, in which case the cost function may be such that:

$$J(\theta) = \|W[y - \hat{c} - m(\theta)]\|^2 \quad (19)$$

W is a diagonal matrix of dimension (n,n) each term of which is the inverse of the variance of the observation noise assigned to each channel of the vector y. For example, for each channel i, $$W(i, i) = \frac{1}{\sqrt{y(i)}} \quad (20)$$

Regardless of the cost function used, constraining the minimization $$\theta = \underset{\theta}{\mathrm{argmin}} \, (J(\theta))$$

by imposing m=Ua, the matrix U being predetermined, facilitates the implementation of the inversion algorithm. Therefore, the formulation of a direct model, in the analytical form m=Ua, allows the joint estimation of m, a and optionally $k_D$.

Second Embodiment

The objective of the second embodiment is to process a measured spectrum y, during a calibration, so as to extract peaks and estimate at least one parameter, chosen from among the position, the area and the full width at half maximum, of the peaks present in the vector m. According to this embodiment, the object is any object. Unlike the first embodiment, the energy function $f_e$ and resolution function $f_r$ are not assumed to be known. The same applies for the observation efficiency E. Therefore, the steps described below are implemented for the purposes of calibrating the detector.

The main steps of this embodiment are shown schematically in FIG. 9.

Step 200: measuring the spectrum y using the measuring device 1.

Step 210: extracting the vector m+b

The vector m+b is for example estimated by carrying out the subtraction:

$$y - \hat{c} = m + b \quad (6)$$

$\hat{c}$ may be estimated using a baseline estimation algorithm as described above. Step 220: taking into consideration a spectral dispersion matrix D' of dimension (n,p), each term of which is such that $$d'_{ik} = \frac{1}{N_k} \int_{ei}^{ei+1} \frac{1}{w_{c,k}} f_s\!\left(\frac{e - E_{c,k}}{w_{c,k}}\right) de \quad (21)$$

In this embodiment, the spectral dispersion matrix D' forms the transfer matrix for the method, taking into consideration an arbitrary energy function, such that: $e_i = i-1$: one channel is equivalent to 1 keV.

$w_{c,k}$ corresponds to the full width at half maximum of the peak of rank k, expressed in channels; the variables $w_{c,k}$ for each peak form a vector we of parameters of the matrix D'.

$E_{c,k}$ is a channel of the spectrum corresponding to the position of the center of the energy peak $E_k$. $E_{c,k}$ is a real number, between 0 and n+1. $E_{c,k}$ may be between two successive ranks k and k+1. The channels $E_{c,k}$ corresponding to each peak form a vector $E_c$ of dimension (1,p). p denotes the number of peaks detected. The vector $E_c$ is a vector of parameters of the matrix D'.

The spectral dispersion matrix D' may be considered to be an initial spectral dispersion matrix, used prior to determining the energy function of the detector. The initial spectral dispersion matrix D' is established analogously to the matrix D described above, taking into consideration a simplifying arbitrary energy function according to which each channel corresponds to 1 keV.

Unlike the first embodiment:

the values $w_{c,k}$ are not known but constitute parameters of the spectral dispersion matrix D';

the channels $E_{c,k}$ are not known and also constitute parameters of the spectral dispersion matrix D';

the matrix D' is not determined. Its parametric form is known and corresponds to expression (21).

Step 230: extracting peak areas.

During this step, the direct model is taken into consideration:

$$m = D's \qquad (22)$$

where:

s is a vector of dimension (p,1) and contains terms $s_k$ respectively representative of the number of photons detected in a peak centered on the channel $E_{c,k}$. The vector s determines the area of each peak of the spectrum, taking into consideration the spectral response function of the detector.

D' is a transfer matrix of the direct model

The vector s may be estimated by implementing an optimization algorithm, for example as described in step 150, which leads to obtaining an estimate ŝ together with the estimate of m.

The optimization algorithm makes it possible to minimize a cost function J so as to determine the vectors s and m and the vectors of parameters $w_c$ and $E_c$.

Just as in the first embodiment, an optimization algorithm for minimizing a cost function J is implemented so as to determine s, $w_c$ and $E_c$.

The cost function may be such that:

$$J(\theta) = \|y - \hat{c} - m(\theta)\|^2 \qquad (23)$$

$$\text{with } m = D's \qquad (22)$$

where θ corresponds to unknown variables governing the cost function: these are s and $w_c$ and $E_c$. $\| \; \|$ denotes the L2 norm operator. Minimizing the cost function makes it possible to estimate the unknowns θ using the expression:

$$\theta = \underset{\theta}{\arg\min}(J(\theta)) \qquad (18)$$

Regardless of the cost function used, constraining the minimization $$\theta = \underset{\theta}{\arg\min}(J(\theta))$$

by imposing m=D's, the matrix D' being conditioned, facilitates the implementation of the inversion algorithm.

The vector $w_c$ makes it possible to define the resolution function $f_r$, according to expression (3), using the energy function $f_c$, establishing the channel/energy relationship.

The vector $E_c$ may be used during energy calibration, in particular to determine the energy function $f_e$ described above, establishing a channel/energy relationship. It is possible to take into consideration a threshold beyond which each channel, corresponding to an emission energy $E_k$, is considered to contain a significant quantity of detected photons. The ranks of the channels for which the value $s_k$ is greater than the threshold are extracted. The selected channels may be confronted with the emission energies of the radionuclides present in the calibration object. This thus gives various channel-energy pairs that may be used to determine the energy function $f_e$.

For example, the ranks of the selected channels may be classified in ascending order, as may the emission energies, so as to associate an emission energy with each channel: the channel with the lowest rank is associated with the lowest emission energy—the channel with the highest rank is associated with the highest emission energy. The energy function $f_e$ has a predetermined parametric form, for example a polynomial one. The parameters of the energy function (coefficients of the polynomial) are adjusted on the basis of the various channel-energy pairs.

It should be noted that this embodiment makes it possible to carry out a calibration in a highly automated manner, without having to carry out manual or computer-aided delimitation of the peaks forming the spectrum y.

FIG. 10 shows one implementation of peak area extraction implementing the second embodiment. FIG. 10 shows, on various energy channels (x-axis), the measured spectrum y (dark curve) along with an estimate of the component c+b (light curve). The vector m corresponds to the difference between the two curves.

Third Embodiment

The objective of the third embodiment is to process a measured spectrum y during a calibration so as to:

estimate the transfer function h or the observation efficiency ε described above.

estimate the parameters β of the energy function $f_e$;

estimate the parameters α of the resolution function $f_r$ estimate the scalar $k_D$, described in relation to (8) when at least one radionuclide emits a photon at 511 keV.

In this embodiment, the object may be a calibration object, comprising sources the radionuclides and associated activities of which are known. When the absorption efficiency $ε_a$ is known, the method makes it possible to estimate h. Otherwise, the method makes it possible to estimate E.

When the activities of the radionuclides is unknown, the method makes it possible to extract the areas of the peaks forming the vector m.

The main steps of this embodiment are shown schematically in FIG. 11.

Step 300: measuring the spectrum y using the measuring device.

Step 310: extracting the vector m+b

The vector m+b may be estimated by carrying out the subtraction:

$$y - \hat{c} = m + b \qquad (6)$$

ĉ may be estimated using a baseline estimation algorithm as described above.

Step 320: taking into consideration the spectral dispersion matrix D, which is defined beforehand. Each term of the spectral dispersion matrix D is such that:

$$d_{ik} = \frac{1}{N_k(e_{i+1} - e_i)} \int_{e_i}^{e_{i+1}} \frac{1}{w_k} f_s\left(\frac{e - E_k}{w_k}\right) de \qquad (11)$$

$\beta$ conditions the determination of the values $e_i$ based on each channel i. $e_i$ is defined by the energy function $f_e$, the parametric form of which is determined and parameterized by $\beta$;

$\alpha$ conditions the values of $w_k$: cf. (8) and (9).

The spectral dispersion matrix D is parameterized by: $\beta$, $\alpha$, $k_D$.

Step 330: taking into consideration a vector s', called incidence vector, by taking into consideration the activity of the various radionuclides arranged in the calibration object, and a detection efficiency equal to 1 for each energy. The reference vector is of dimension (1,k). $s'_k$ corresponds to a number of photons detected in a peak centered on the energy $E_k$, taking into consideration the activity of the calibration radionuclides, and considering a detection efficiency, at each energy, equal to 1. According to such a hypothesis, each incident photon is detected. $s'_k$ also corresponds to the number of photons of energy $E_k$ incident on the detector.

Step 340: obtaining a transfer matrix U' for which each term:

$$U'(i, k) = u'_{i,k} = s'_k d_{i,k}. \qquad (24)$$

$$s'_k = \sum_{j=1}^{q} TI_{jk} \varepsilon'_{jk} \qquad (25)$$

$$\text{and } \varepsilon'_{jk} = a_j \varepsilon_a \qquad (26)$$

U' is a matrix of dimension (n,p), each term $u'_{ik}$ of which is an estimate of the number of photons detected in each channel of rank i, taking into consideration the activity of the calibration radionuclides, and a detection efficiency, at each energy, equal to 1. U' is conditioned by $\beta$, $\alpha$, $k_D$.

When the activity of the radionuclides is not known, $s'_k = 1$ is imposed.

FIG. 12 illustrates one example of a matrix U'. The axis X corresponds to each channel i, the axis Y corresponds to each emission energy peak k, and the axis Z corresponds to the value $u'_{ik}$.

Step 350: Estimating the detection efficiency at each energy $E_k$

The direct model may be established:

$$m = U'h \qquad (27)$$

The vector h is estimated by implementing an optimization algorithm, for example a maximum likelihood algorithm, which leads to obtaining an estimate $\hat{h}$. Each term $\hat{h}_k$ of the vector $\hat{h}$ corresponds to a detection efficiency at the energy $E_k$, between 0 and 1.

Regardless of the cost function used, constraining the minimization $$\theta = \underset{\theta}{\operatorname{argmin}} (J(\theta))$$

by imposing m=U'h, the matrix D being conditioned, facilitates the implementation of the inversion algorithm. The vector $\hat{h}$ thus estimated may be used to establish the matrix of reference spectra U by combining expressions (13) and (14).

The vectors m, $\beta$, $\alpha$, h and the optional scalar $k_D$ are determined by implementing an optimization algorithm, as described in the first and second embodiments.

When the absorption efficiency $\varepsilon_a$ is not known, it is assigned a unit value at each energy. Expression (14) becomes:

$$m = U'\varepsilon \qquad (28)$$

The method then makes it possible to determine $\beta$, $\alpha$, $\varepsilon$ and the optional scalar $k_D$.

The method makes it possible to simultaneously carry out an energy calibration, a resolution calibration and an efficiency calibration.

According to one possibility, the method may comprise:

implementing the third embodiment, so as to carry out an efficiency, resolution and energy calibration on the detector;

implementing the first embodiment, so as to determine the activity of an object under analysis.

FIG. 13 shows one implementation of peak area extraction implementing the second embodiment. FIG. 13 shows, on various energy channels (x-axis), the measured spectrum y (dark curve) along with an estimate of the component c+b (light curve). The estimated vector m corresponds to the difference between the two curves.

Although it has been described in connection with nuclear waste, the invention may be applied to the inspection of any other object: equipment or structure of a nuclear installation, fresh or irradiated fuel, or sample taken from the environment.

The invention claimed is:

1. A method for processing an X-ray or gamma-ray radiation spectrum formed by a spectrometric measuring device, the spectrometric measuring device comprising:

a detector configured to detect X-ray or gamma-ray photons and, upon each detection, to form a pulse an amplitude of which depends on an energy released by the X-ray or gamma-ray photon that interacted in the detector; and a spectrometric measuring circuit, configured to form a spectrum, the spectrum corresponding to a number of photons detected in various channels, an amplitude or an energy corresponding to each channel, the method comprising:

a) arranging the device facing an object likely to contain one or more radionuclides emitting X-ray or gamma-ray photons that are incident on the detector, each radionuclide emitting photons at at least one emission energy;

b) detecting, using the detector, a portion of the incident photons and forming a spectrum of the detected photons, the spectrum containing peaks extending around each emission energy of each radionuclide, each peak resulting from pulses detected in a channel and corresponding to the at least one emission energy;

c) processing the spectrum so as to obtain a quantity of pulses detected in each peak of the spectrum, wherein c) comprises:

c1) forming a list of radionuclides that are present or likely to be present in the object;

c2) forming an input vector each term of which containing a quantity of pulses in each peak extracted from the spectrum resulting from b);

c3) forming a spectral dispersion matrix each term of which being associated with a channel and an emission energy, and corresponding to a probability of an incident photon an energy of which is the emission energy being detected in the channel;

c4) forming a transfer matrix, using the spectral dispersion matrix;

c5) forming a direct model, according to which the input vector is obtained by a matrix product of the transfer matrix and an output vector, each term of the output vector corresponding to at least one of:

an activity of at least one radionuclide;

a number of photons detected at an energy corresponding to an emission energy of a radionuclide; or a detection efficiency at an emission energy of a radionuclide; and c6) inverting the direct model, so as to estimate the output vector.

2. The method of claim 1, wherein c6) comprises estimating the input vector, together with the output vector.

3. The method of claim 1, wherein:

c) comprises forming a matrix of reference spectra, stored in a memory, each term of which is associated with an emission energy and a radionuclide, each term corresponding to a number of photons detected in a peak centered on a channel corresponding to the emission energy, when the activity of the radionuclide is equal to a predetermined reference activity;

in c), the transfer matrix is a product of the spectral dispersion matrix and the matrix of reference spectra, such that each term of the transfer matrix is associated with a radionuclide and a channel, each term of the transfer matrix corresponding to a number of photons emitted by the radionuclide at the reference activity that are detected in the channel; and the output vector contains terms respectively representative of the activity of each radionuclide present in the object.

4. The method as claimed in claim 3 wherein the reference activity is 1 Bq.

5. The method of claim 1, wherein:

c) comprises using a matrix of reference spectra, stored in a memory, each term of which being associated with an emission energy and a radionuclide, each term corresponding to a number of photons detected in a peak centered on a channel corresponding to the emission energy, when the activity of the radionuclide is equal to a predetermined reference activity;

in c), the transfer matrix is a product of the spectral dispersion matrix and a transpose of the matrix of reference spectra, such that each term of the transfer matrix is associated with a radionuclide and a channel, each term of the transfer matrix corresponding to a number of photons emitted by the radionuclide at the reference activity that are detected in the channel; and the output vector contains terms respectively representative of the activity of each radionuclide present in the object.

6. The method of claim 5, wherein the reference activity is 1 Bq.

7. The method of claim 1, wherein:

in step c), the transfer matrix is the spectral dispersion matrix; and the output vector contains terms respectively representative of a number of photons detected in channels corresponding each emission energy of the radionuclides present in the object.

8. The method of claim 7, wherein c6) comprises estimating a width of each peak of the input vector, each estimated width parameterizing the spectral dispersion matrix.

9. The method of claim 7, wherein sub-step c6) comprises estimating a position, among the channels, corresponding to the center of each peak of the input vector, each estimated position parameterizing the spectral dispersion matrix.

10. The method of claim 7, wherein:

the object contains calibration radionuclides the emission energies of which are known;

wherein the method further comprises:

based on the output vector, selecting channels in which the spectrum contains a number of photons greater than a threshold;

confronting the selected channels with the emission energies of the calibration radionuclides; and determining an energy function linking each channel to an energy on a basis of the confronting.

11. The method of claim 1, wherein:

the object contains calibration radionuclides a nature of which are known;

c) comprises taking into consideration an incidence vector each term of which corresponds to a number of photons incident on the detector at each emission energy;

in c), the transfer matrix is a product of each term of the spectral dispersion matrix, associated with an emission energy, and a value of the incidence vector, at the emission energy, such that each term of the transfer matrix is associated with an emission energy and a channel, each term of the transfer matrix corresponding to a number of photons emitted by each calibration radionuclide that are detected in the channel; and the output vector contains terms respectively representative of the detection efficiency of the device at various emission energies.

12. The method of claim 11, wherein c) comprises using an energy function, wherein the energy function:

establishes a correspondence between a rank of a channel and an energy value; and is a parametric function parameterized by at least one energy parameter, the method being such that c6) comprises estimating the energy parameter of the energy function.

13. The method of claim 12, wherein c) comprises using a resolution function, wherein the resolution function:

determines a width of each peak as a function of a channel or energy; and is a parametric function parameterized by at least one resolution parameter, and wherein c6) comprises estimating the at least one resolution parameter of the resolution function.

14. The method of claim 1, wherein:

the object contains calibration radionuclides a nature and an activity of which are known;

c) comprises taking into consideration an incidence vector each term of which corresponds to a number of photons incident on the detector at each emission energy; and in c), the transfer matrix is a product of each term of the spectral dispersion matrix associated with an emission energy and a value of the incidence vector at the emission energy, wherein each term of the transfer matrix is associated with an emission energy and a channel, each term of the transfer matrix corresponding to a number of photons, emitted by each calibration radionuclide, that are detected in the channel; and the output vector contains terms respectively representative of the detection efficiency of the device at various emission energies.

15. The method of claim 14, wherein c) comprises using an energy function, wherein the energy function:

establishes a correspondence between a rank of a channel and an energy value; and is a parametric function parameterized by at least one energy parameter, wherein c6) comprises estimating the energy parameter of the energy function.

16. The method of claim 15, wherein c) comprises using a resolution function, wherein the resolution function:

determines a width of each peak as a function of a channel or energy; and the resolution function is a parametric function parameterized by at least one resolution parameter, wherein c6) comprises estimating the resolution parameter of the resolution function.

17. The method of claim 1, wherein c6) comprises using a shape function, the shape function establishing an analytical relationship that models a shape of each peak of the detected spectrum.

18. A device configured to acquire a spectrum of X-ray or gamma-ray photons emitted by an object, the object being likely to contain radionuclides, comprising:

a detector, configured to detect X-ray or gamma-ray photons and, upon each detection, to form a pulse an amplitude of which depends on an energy released by the X-ray or gamma-ray photon that interacted in the detector;

a spectrometric measuring circuit, configured to form a spectrum, the spectrum corresponding to a distribution of the amplitudes of the pulses detected by the detector; and a processing unit, programmed to implement c) of the method of claim 1.

19. A non-transitory medium configured to be connected to a computer, comprising instructions, when executed by the computer, perform c) of the method as claimed in claim 1 based on a spectrum resulting from a spectrometric detector.

* * * * *